(12) United States Patent
Ishii et al.

(10) Patent No.: US 7,413,346 B2
(45) Date of Patent: Aug. 19, 2008

(54) FOIL BEARING

(75) Inventors: Ichiro Ishii, Ueno (JP); Mitsuo Matsushima, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 568 days.

(21) Appl. No.: 10/946,331

(22) Filed: Sep. 22, 2004

(65) Prior Publication Data

US 2005/0111767 A1 May 26, 2005

(30) Foreign Application Priority Data

Oct. 3, 2003 (JP) .............................. 2003-345213

(51) Int. Cl.
*F16C 32/06* (2006.01)
(52) U.S. Cl. ...................................... 384/103
(58) Field of Classification Search ................. 384/103, 384/104, 105, 106, 125, 215
See application file for complete search history.

(56) References Cited

U.S. PATENT DOCUMENTS

| | | | |
|---|---|---|---|
| 3,884,534 A * | 5/1975 | Winn ........................ 384/106 |
| 4,178,046 A | 12/1979 | Silver et al. |
| 4,277,113 A | 7/1981 | Heshmat |
| 4,848,935 A * | 7/1989 | Seibig et al. ................ 384/276 |
| 5,228,785 A * | 7/1993 | Saville et al. ............... 384/103 |
| 5,634,723 A * | 6/1997 | Agrawal ..................... 384/103 |
| 5,911,511 A * | 6/1999 | Saville ....................... 384/106 |
| 6,450,688 B2* | 9/2002 | Matsushima ............... 384/103 |

* cited by examiner

*Primary Examiner*—Richard W L Ridley
*Assistant Examiner*—Justin Krause
(74) *Attorney, Agent, or Firm*—Squire Sanders & Dempsey L.L.P.

(57) ABSTRACT

The present invention provides a foil bearing (1), comprising: a stationary mount member (2) surrounding an outer circumferential surface of a journal (13) of a rotating member via an annular gap (G); and a plurality of centripetal force producing foils (e.g., middle foils 12) arranged in a circumferential direction in the annular gap, where each of the centripetal force producing foils has one end fixed to the stationary mount member, wherein portions of the stationary mount member located between fixed ends of adjoining ones of the centripetal force producing foils are formed with an axially extending slit (4).

5 Claims, 6 Drawing Sheets

FOIL BEARING

TECHNICAL FIELD

The present invention relates to a foil bearing comprising a stationary mount member surrounding a journal of a rotating member via an annular gap and a foil assembly disposed in the gap to support the journal.

BACKGROUND OF THE INVENTION

It is conventionally known to use a foil bearing as a bearing for a rotating member that rotates at a high speed such as at tens of thousands rpm, in which the foil bearing comprises a plurality of foils (flexible membranes) for forming a bearing surface and supports a journal (or shaft) of the rotating member by means of pressure of a fluid dragged in between the journal and the foils as the rotating member rotates. Some of such foil bearings may comprise a plurality of bump foils as disclosed in U.S. Pat. No. 4,277,113 issued to Heshmat, or may have a plurality of leaf foils as disclosed in U.S. Pat. No. 4,178,046 issued to Silver et al.

In these foil bearings, the bump foils or leaf foils are formed by press-working a flexible thin metallic plate or the like so that they provide a resilient force for urging the journal generally in a direction toward a rotational center. If the foils arranged in the circumferential direction have a uniform rigidity (or stiffness), the center of rigidity coincides with the geometric center of the bearing. In such a case, when the journal is rotating, the rotation center of the journal in an equilibrium state is determined by an amount of deformation of the foils under a weight of the rotating member, and thus, if the rotation is clockwise, the rotation center will be shifted in a lower left direction with respect to the center of the bearing at low rotational speeds.

As the rotational speed of the journal increases, an air force acting upon the journal in an upper left direction becomes larger so that the center of the journal moves clockwise from the lower left shifted position toward the center of rigidity of the foils (or the center of the bearing). When the center of the journal approaches the center of the bearing, the air force acting upon the journal is reduced and the center of the journal moves in the lower left direction again. The process is repeated at a frequency corresponding to the rotational speed to cause a whirling instability of the journal. In case of an air-film foil bearing, a force constraining the journal is relatively small, and thus, the above instability tends to become large particularly at a primary bending resonance point, making it difficult for the rotating member to pass the resonance point safely as the rotation thereof is accelerated.

In order to suppress such an instability and allow the rotating member to pass the primary bending resonance point safely, it is necessary to reduce the amount of deformation of the foils due to the weight of the rotating member, or, to provide the foils with appropriate rigidity and make the foils exert an appropriate damping force. One way for that is to make the center of rigidity of the foils located at a higher position than the geometric center of the bearing by, for example, providing a higher rigidity to the bump foils or leaf foils disposed at lower positions than those disposed at higher positions.

However, it is quite difficult to control with high precision the rigidity or damping characteristics of a number of bump foils or leaf foils which are formed by press-working, and also, change in the rigidity and damping characteristics of the foils requires considerable change in the manufacturing process. Further, arranging the foils such that the foils at various circumferential positions have a suitable rigidity for their positions tends to result in a reduction in the yield of the completed foil bearing which requires quite high precision in various dimensions such as an inner diameter, cylindricity of the inner peripheral surface, etc. Due to these reasons, it has been quite difficult to achieve the center of rigidity of the foil bearing positioned higher than the geometric center of the bearing to reduce the oscillation at the primary bending resonance point and improve the rotation performance of the foil bearing.

BRIEF SUMMARY OF THE INVENTION

In view of the above observations of the prior art, a primary object of the present invention is to provide a foil bearing in which the rigidity can be easily adjusted to effectively reduce the oscillation at the primary bending resonance point.

A second object of the present invention is to provide a foil bearing that can make the center of rigidity of the bearing located at a higher position than the geometric center of the bearing without the need for complicated manufacturing process.

A third object of the present invention is to provide a foil bearing that can effectively provide a sufficient damping force for ensuring a steady rotation of the rotating member at high speeds.

In order to achieve such objects, the present invention provides a foil bearing (1), comprising: a stationary mount member (2) surrounding an outer circumferential surface of a journal (13) of a rotating member via an annular gap (G); and a plurality of centripetal force producing foils (e.g., middle foils 12) arranged in a circumferential direction in the annular gap, where each of the centripetal force producing foils has one end fixed to the stationary mount member, wherein portions of the stationary mount member located between fixed ends of adjoining ones of the centripetal force producing foils are formed with an axially extending slit (4).

The axially extending slits divide the circumferential wall of the stationary mount member into a plurality of circumferentially divided parts (5), and it is possible to control an absolute value of the rigidity of the stationary member as well as circumferential rigidity distribution of the stationary mount member by adjusting the rigidity of each divided part for instance by varying the radial dimension (thickness) and/or circumferential dimension (angle or width) of each divided part. Because machining of the stationary mount member is relatively easy, such adjustment of the rigidity of the divided parts can be achieved easily and with high precision. This can make it possible to adjust the position of the center of rigidity of the stationary mount member (and hence of the foil assembly) as desired, to whereby improve the performance of the foil bearing without individually controlling the properties, such as rigidity, of the foils attached to the stationary mount member depending on the positions at which they are disposed.

Preferably, the stationary mount member is provided with a thin portion (6) at either axial end thereof. This can widen the adjustable range of the rigidity of the stationary mount member.

According to another embodiment of the present invention, there is provided a foil bearing, comprising: a stationary mount member surrounding an outer circumferential surface of a journal of a rotating member via an annular gap; and a plurality of centripetal force producing foils arranged in a circumferential direction in the annular gap, where each of the centripetal force producing foils has one end fixed to the stationary mount member, wherein portions of the stationary mount member located between fixed ends of adjoining ones of the centripetal force producing foils are formed with an axially extending and inwardly facing groove (23) and wherein a plate member (25) is fitted in the groove, with axial ends of the plate member being fixed to the stationary mount member such that an axially middle portion of the plate member does not contact a bottom of the groove.

According to such a structure, it is possible to arbitrarily set the center of rigidity of the stationary mount member by adjusting the material and/or thickness of the plate members, to whereby improve the performance of the foil bearing easily.

Preferably, the bottom of each of the grooves of the stationary mount member is formed with an opening (24). This ensures that the plate member does not contact the bottom of the groove of the stationary mount member so that the plate member can slightly deform in the radial direction.

In the above foil bearings, the centripetal force producing foils preferably comprise a plurality of thin plates (12a, 12b, 12c) each having a base end fixed to an inner peripheral surface of the stationary mount member and extending in the circumferential direction, wherein free end portions of the thin plates extending in opposite circumferential direction overlap each other. In this way, when the rotating member rotates and the thin plates (foils) oscillate, they slide relative to each other to cause frictional damping (Coulomb damping), thereby achieving desired damping characteristics easily. Further preferably, the thin plates are provided with a coating, such as copper coating, for controlling a frictional coefficient.

Thus, the present invention can provide an improved freedom of adjustment of the center of rigidity of the foil bearing while achieving a sufficiently high precision required for the foil bearing, and therefore is highly beneficial in improving the performance of the foil bearing.

Other and further objects, features and advantages of the invention will appear more fully from the following description.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
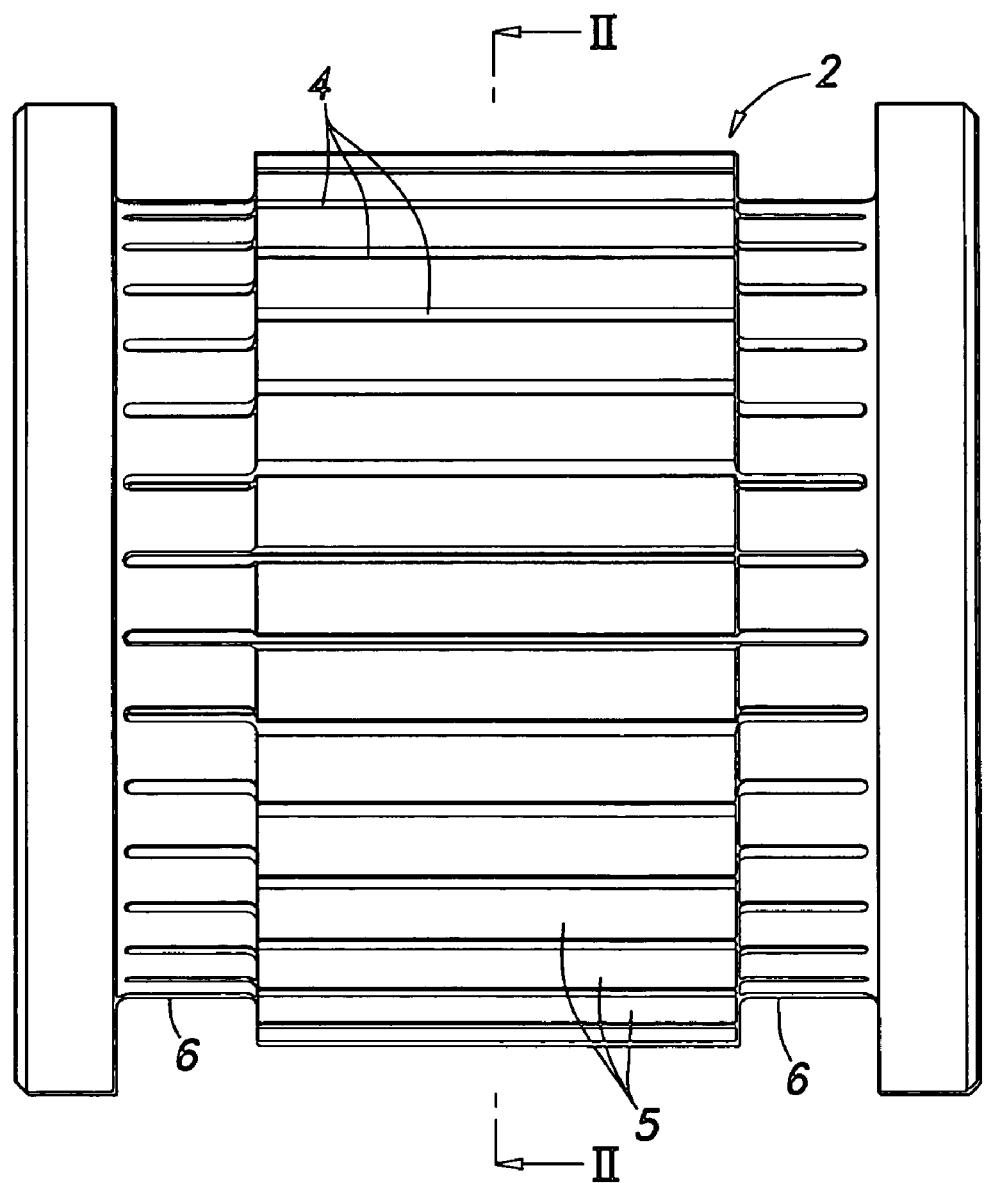
FIG. 1 is a side view of a foil bearing according to one embodiment of the present invention.
Figure 2:
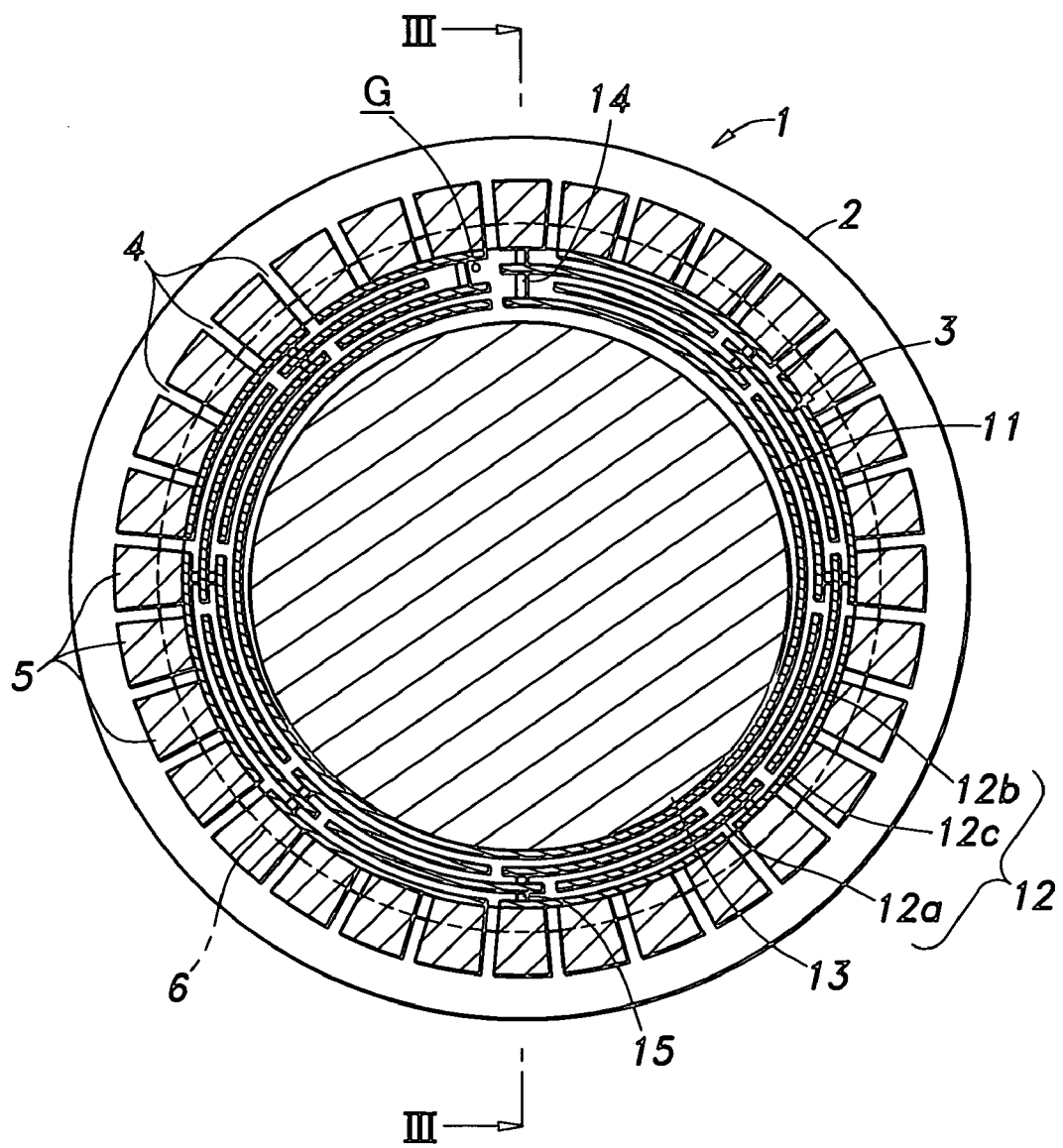
FIG. 2 is a cross-sectional view taken along the line II-II in FIG. 1.
Figure 3:
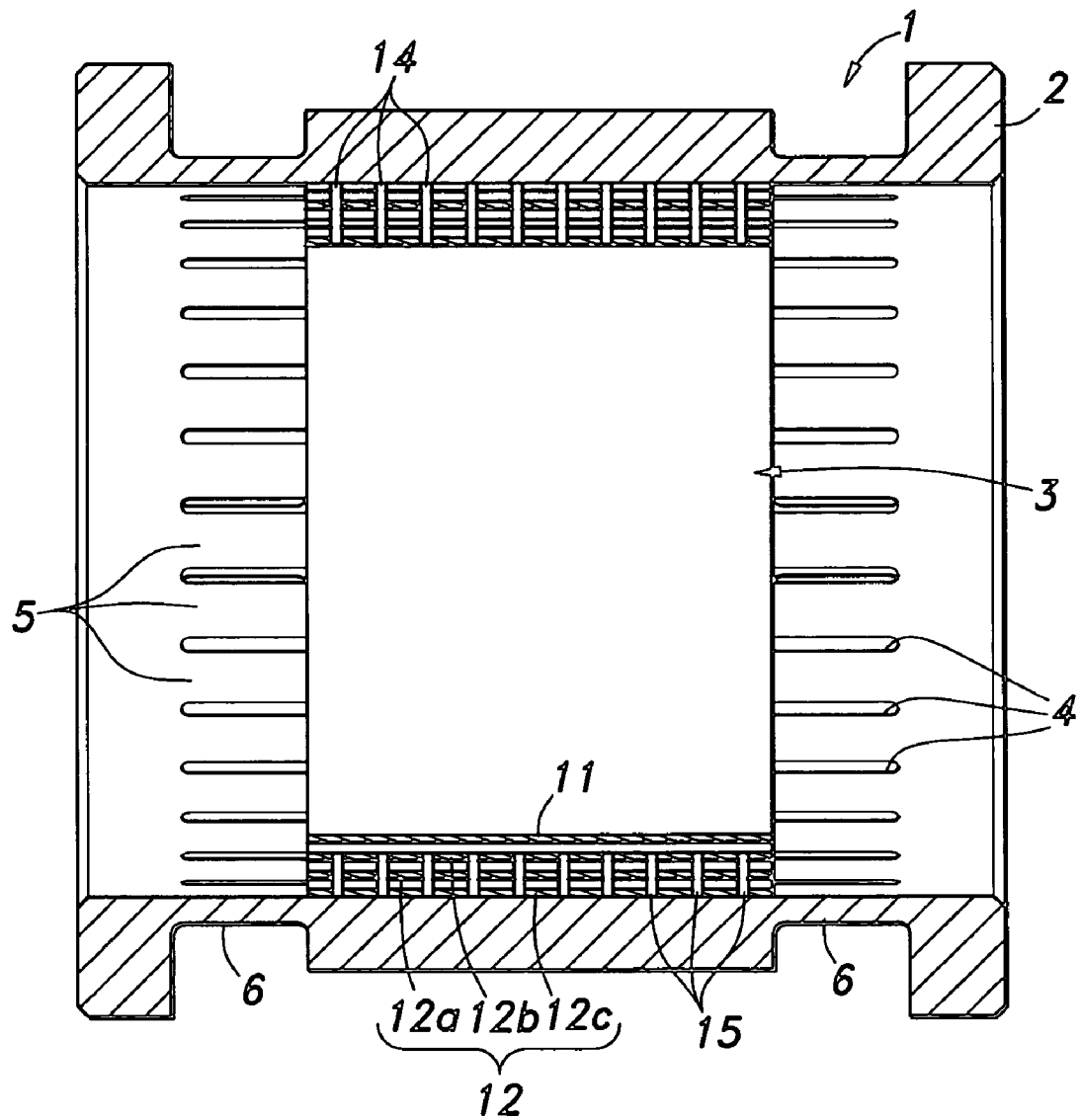
FIG. 3 is a cross- sectional view taken along the line III-III in FIG. 2.
Figure 4:
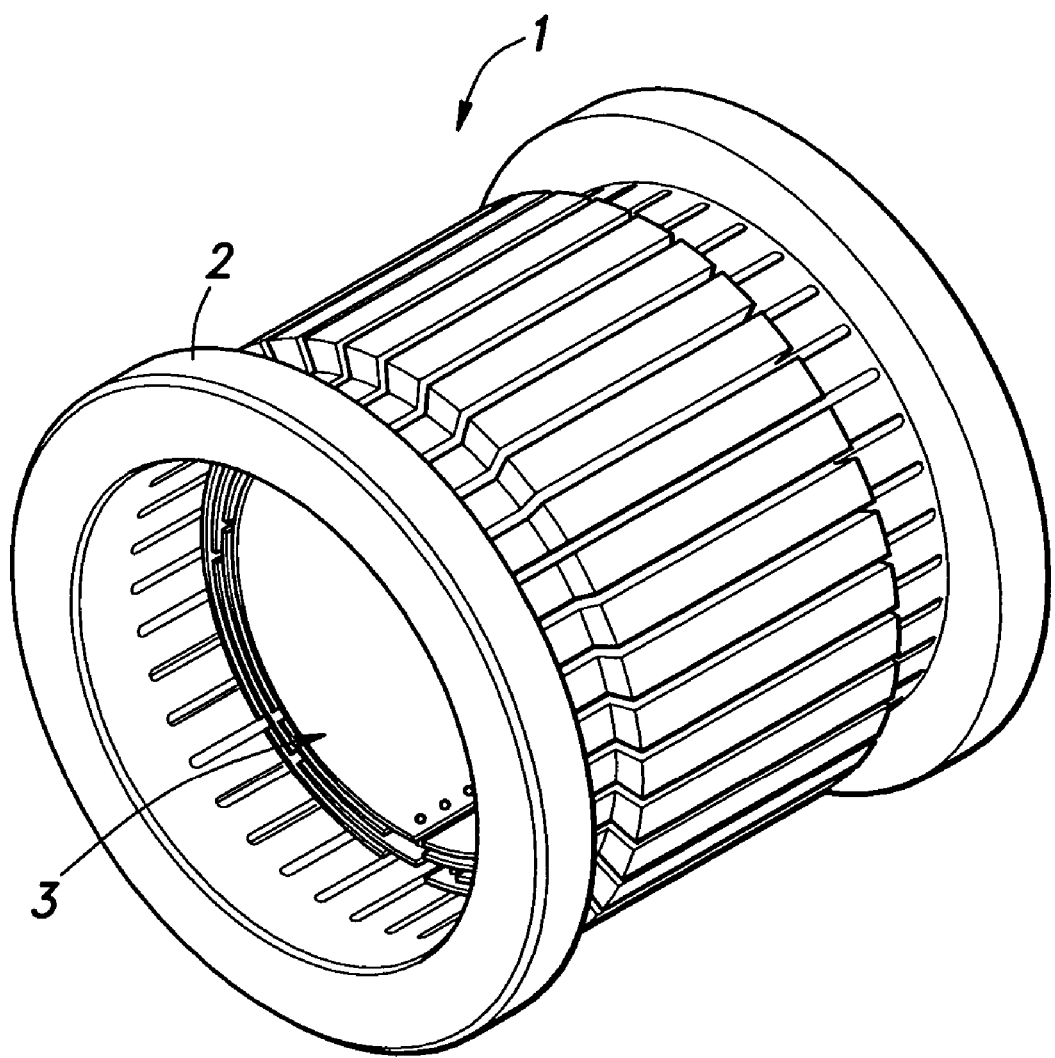
FIG. 4 is a perspective view showing the foil bearing of FIG. 1.

FIGS. 1-4 show an embodiment of a foil bearing according to the present invention. FIG. 1 is a side view thereof, FIG. 2 is a cross-sectional view of an axially middle portion thereof taken along a line perpendicular to the center axis, FIG. 3 is a cross-sectional view along the center axis, and FIG. 4 is a perspective view showing an outer appearance of the foil assembly. It should be noted that in order to clarify the relationship between the various parts, the parts in the drawings may not be shown to the scale.

As shown in the drawings, a foil bearing 1 comprises a stationary mount member 2 having a substantially cylindrical shape with a round inner peripheral surface, and a foil assembly 3 attached to the inner peripheral surface of the stationary mount member 2.

At positions dividing the circumferential wall of the stationary mount member 2 into a plurality of equal parts (for example, into from eight parts to 32 parts), the stationary mount member 2 is formed with axial slits 4. The slits 4 are formed such that the axial ends of the stationary mount member 2 are left intact so as to preserve the integrity of the cylindrical shape of the stationary mount member 2.

The slits 4 divides circumferential wall of the stationary mount member 2 into a plurality of divided parts 5 which are each provided with a thin portion 6 at either axial end. The thickness of the thin portion 6 is selected such that the rigidity (or elastic deformability) of each divided part 5 allows an axially middle portion of each divided part 5 to move slightly in a radial direction.

The rigidity of each divided part 5 can be arbitrarily adjusted as desired by selecting the thickness of the thin portion 6 and/or radial and circumferential dimensions (or thickness and angle) of the divided part 5 itself. Thus, by providing a higher rigidity to the divided parts 5 positioned on a lower side of the stationary mount member 2 than to those positioned at an upper side, for example, it is possible to make a lower portion of the circumferential wall of the stationary mount member 2 have a higher rigidity (or be less deformable) than an upper portion of the same, whereby achieving a center of rigidity of the stationary mount member 2 positioned higher than a geometric center of the same.

The foil assembly 3 comprises a top foil 11 and a plurality of middle foils 12 disposed outside of the top foil 11 and arranged in three layers. A journal 13 of a rotating member, which has a substantially round contour in a cross-section perpendicular to the axial line, is inserted into a central portion of the stationary mount member 2 such that the inner peripheral surface of the stationary mount member 2 and the outer peripheral surface of a journal 13 define an annular gap G therebetween, in which the foil assembly 3 is disposed.

The top foil 11 consists of a smooth sheet member curved in a substantially cylindrical shape, and one end thereof is welded to an inner surface of one of the divided parts 5 positioned at a top portion of the stationary mount member 2 by a plurality of axially arranged spot-welds 14 while the other end thereof extends clockwise to wrap around the journal 13.

The middle foils 12 each consist of a thin plate (or leaf piece). More specifically, the middle foils 12 comprise middle-layer leaf pieces 12a, inner-layer leaf pieces 12b and outer-layer leaf pieces 12c. The middle, inner, and outer-layer leaf foils 12a, 12b, 12c can be formed by curving a smooth sheet member into a substantially cylindrical shape like the top foil 11 and cutting it at appropriate angles, for example. Each leaf piece 12a, 12b, 12c has a base end secured to an inner surface of an associated divided part 5 of the stationary mount member 2 by spot welds 15, and the middle-layer leaf pieces 12a extend clockwise from the base ends while the inner and outer-layer leaf pieces 12b, 12c extend counterclockwise from the base ends. In this embodiment, three leaf pieces 12a, 12b, 12c, one from each layers, form a unit in which the leaf piece 12a is sandwiched between the leaf pieces 12b, 12c and the overlapping base portions thereof are bonded together by the spot welds 15. As seen in FIG. 2, a plurality of such units of leaf pieces are arranged at an interval in the circumferential direction such that they are attached to one of every predetermined number (four, for example) of divided parts 5 by means of spot-welds 15.

The plurality of units of leaf pieces 12a, 12b, 12c are arranged such that the middle leaf piece 12a of one unit slidably overlaps with the oppositely extending inner and outer leaf pieces 12b, 12c of an adjoining unit to form the three-layered structure. The leaf pieces 12a, 12b, 12c always exert a center-directed elastic force (or centripetal force) upon the journal 13 and serves as centripetal force producing foils.

When the journal 13 oscillates, the oscillation is transmitted to the divided parts 5, and the oscillation of the divided parts 5 causes the leaf pieces 12a, 12b, 12c of the different layers to slide relative to each other to thereby cause frictional damping (Coulomb damping). In order to create the frictional damping force effectively, both surfaces of each leaf piece 12a, 12b, 12c as well as the outer circumferential surface of the top foil 11 are applied with a copper coating, for example. The damping characteristics can be controlled as desired by changing the material and/or thickness of the coating to adjust a friction coefficient or by increasing/decreasing the number of middle foils 12 included in the foil assembly 3. The inner peripheral surface of the top foil 11 is preferably applied with a polytetrafluoroethylene (PTFE) coating or the like in order to reduce frictional rotation resistance at a low rotational speed.

Figure 5:
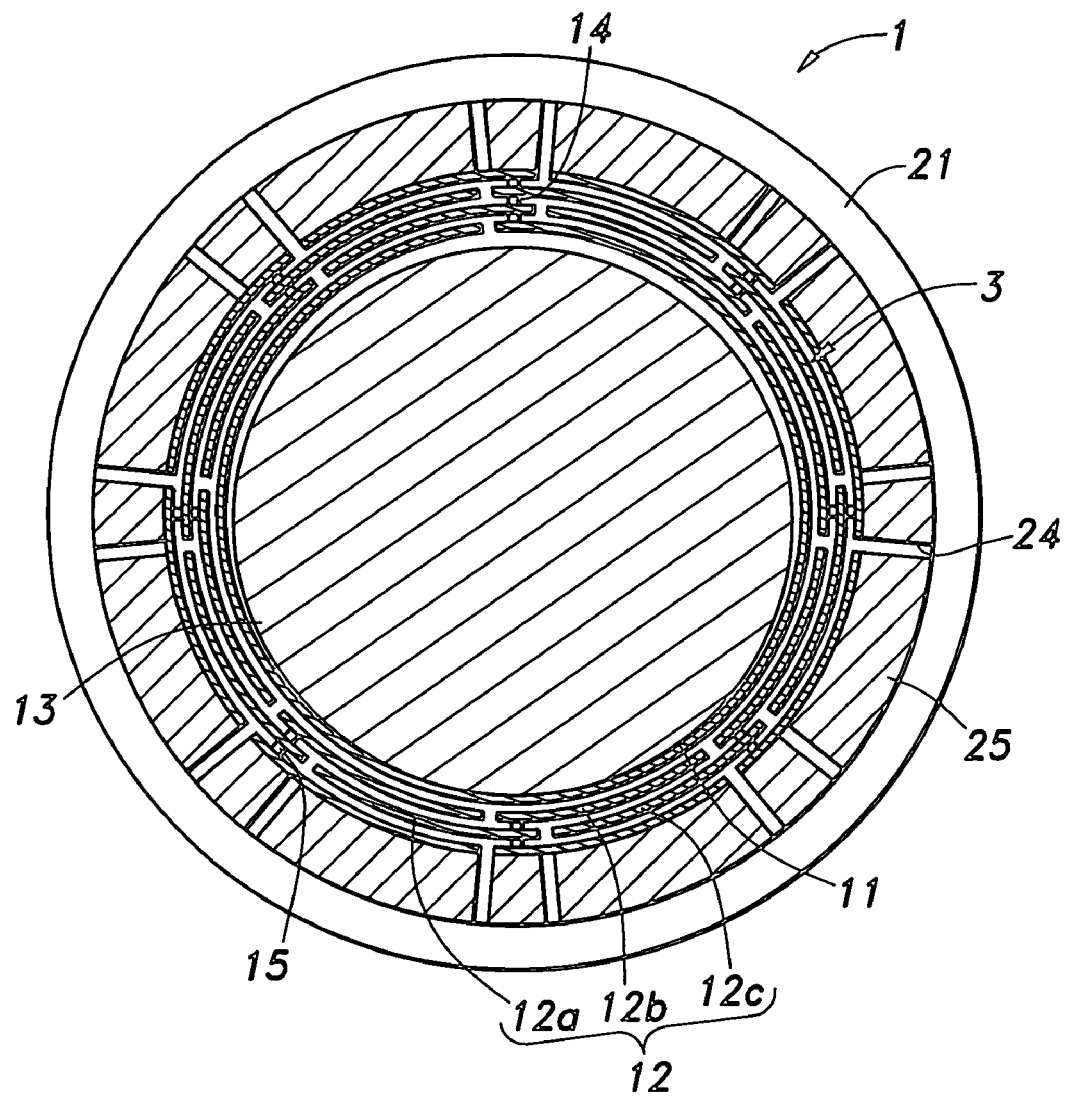
FIG. 5 is a cross-sectional view similar to FIG. 2 and shows a foil bearing according to another embodiment of the present invention.
Figure 6:
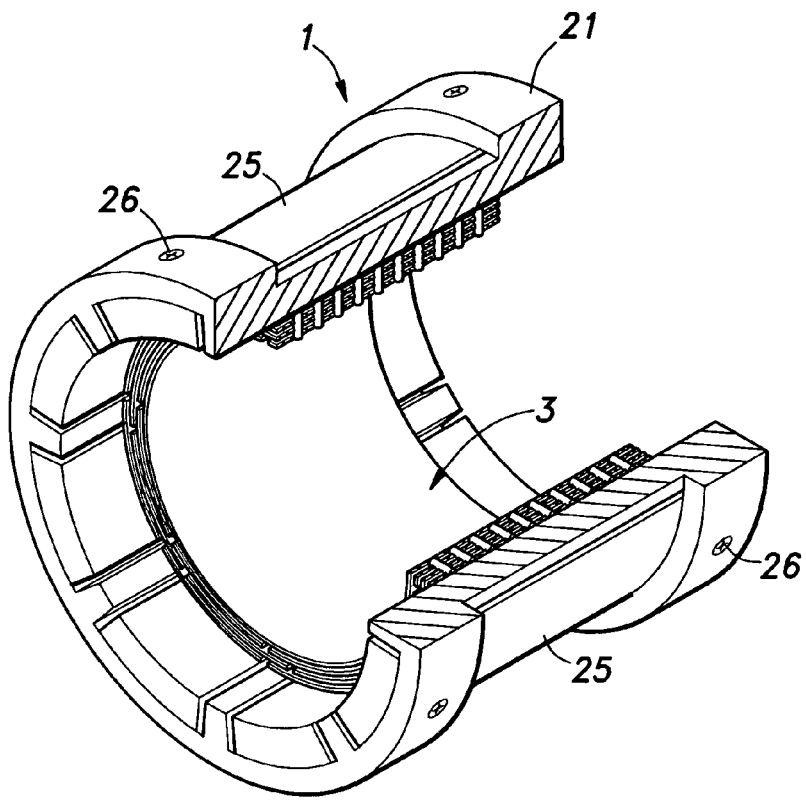
FIG. 6 is a perspective view of the foil bearing shown in FIG. 5, with part thereof being cut away.
Figure 7:
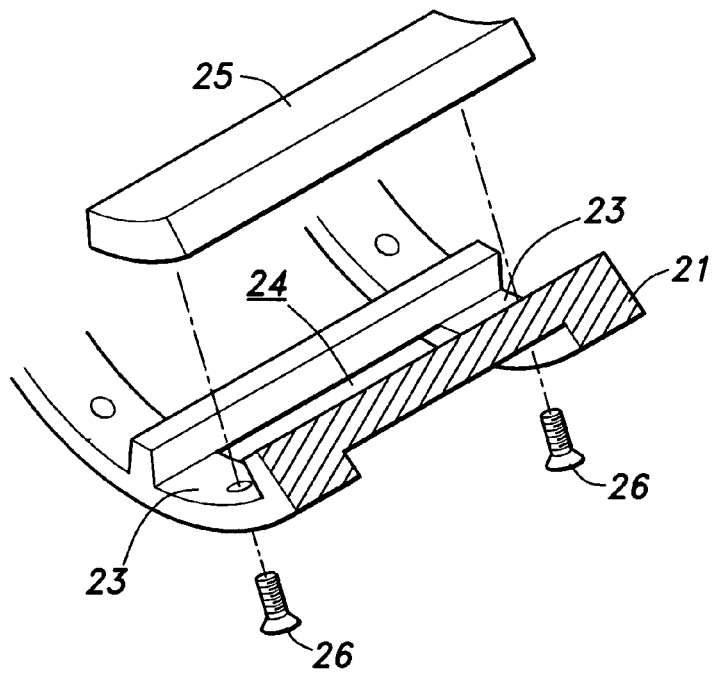
FIG. 7 is a perspective view of essential part of the foil bearing shown in FIG. 5.

FIGS. 5-7 show another embodiment of a foil bearing according to the present invention. In this embodiment, the foil assembly 3 is substantially identical to that shown in the above described first embodiment, and thus explanation thereof is omitted. In this embodiment, portions of a stationary mount member 21 opposing the elastically deformable portions of the middle foils 12, i.e., portions of the stationary mount member 21 between the fixed portions of the middle foils 12, are formed with an axial groove 23 and an opening 24. The stationary mount member 21 further comprises bridge members 25 each of which consists of a rectangular metal plate (or strip) curved in an arcuate shape and are fitted in an associated one of the grooves 23 to extend axially across the opening 24. Axial ends of the bridge members 25 are fixed to an inner periphery of the stationary mount member 21 by means of screws 26 or the like.

The weight of the journal 13 acts upon an axially middle portion of the bridge members 25 via the middle foils 12, and thus, the center of rigidity of the bearing is determined by cooperation of the rigidity of the bridge members 25 and that of the middle foils 12. Therefore, in this embodiment, it is possible to arbitrarily adjust the position of the center of rigidity of the bearing by suitably selecting the material and/or thickness of the bridge members 25 and whereby providing each bridge member 25 with appropriate rigidity. It should be noted that what is essential is that the circumferential rigidity distribution of the stationary mount member 21 can be appropriately determined as desired and therefore, for example, the openings 24 in the stationary mount member 21 in the above embodiment may be replaced by axial grooves, which is deeper than the grooves 23, such that when the bridge members 25 is fitted in the grooves 23, the bottoms of the deeper grooves are spaced apart from the bridge members 25.

As described above, according to the present invention, the circumferential rigidity distribution of the stationary mount member 2, 21 can be appropriately adjusted to set the center of rigidity of the bearing as desired without relying upon the manufacturing precision of the middle foils 12. Thus, as the rotational speed increases and the journal 13 is lifted, the journal will reach an equilibrium position corresponding to the rotational speed and steadily rotates there with no or little whirling. In other words, in the foil bearing 1 according to the present invention, the oscillation of the journal 13 at the primary bending resonance point can be considerably reduced so that the journal 13 can pass the resonance point safely as the rotation is accelerated.

Although the present invention has been described in terms of preferred embodiments thereof, it will be obvious to a person skilled in the art that various alterations and modifications are possible without departing from the scope of the present invention which is set forth in the appended claims. For example, in the above embodiments, the middle foils are arranged in three layers, but they may be in other number of layer(s).

The invention claimed is:

1. A foil bearing, comprising:
    a stationary mount member surrounding an outer circumferential surface of a journal of a rotating member via an annular gap;
    a plurality of centripetal force producing foils arranged in a circumferential direction in the annular gap, where each of the centripetal force producing foils has one end fixed to the stationary mount member,
    wherein portions of the stationary mount member located between fixed ends of adjoining ones of the centripetal force producing foils are formed with an axially extending slit which radially extends through a portion of the stationary mount members; and
    a top foil positioned in the annular gap between the outer surface of the journal and the plurality of centripetal force producing foils; wherein the stationary mount member comprises a first axial end portion and a second axial end portion, wherein the first and second axial end portions have a radial thickness which is thinner relative to a radial thickness of an axial middle portion of the stationary mount member between the first and second axial end portions.

2. A foil bearing according to claim 1, wherein an axial length and an axial position of the axial middle portion is substantially equal to an axial length and an axial position of the centripetal force producing foils.

3. A foil bearing according to claim 1, wherein the centripetal force producing foils comprise a plurality of thin plates each having a base end fixed to an inner peripheral surface of the stationary mount member and extending in the circumferential direction, wherein free end portions of the thin plates extending in opposite circumferential direction overlap each other.

4. A foil bearing according to claim 3, wherein the thin plates are provided with a coating for controlling a frictional coefficient.

5. A foil bearing according to claim 4, wherein the coating comprises copper.

* * * * *